US007765297B2

(12) United States Patent
Wolfe et al.

(10) Patent No.: US 7,765,297 B2
(45) Date of Patent: Jul. 27, 2010

(54) SYSTEM FOR PROVIDING ONLINE SERVICE REPORTS

(75) Inventors: Chris A. Wolfe, Rancho Santa Fe, CA (US); Catherine Chow, Del Mar, CA (US); John Harvey, San Diego, CA (US); John Walters, San Diego, CA (US); Mark Heil, Del Mar, CA (US); Peggy A. Erlandson, San Diego, CA (US); Joe Rassenti, San Diego, CA (US); Vikram Yashpal, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1049 days.

(21) Appl. No.: 10/010,587

(22) Filed: Nov. 13, 2001

(65) Prior Publication Data

US 2003/0093554 A1 May 15, 2003

(51) Int. Cl.
*G06F 15/173* (2006.01)

(52) U.S. Cl. ....................... 709/225; 709/203; 709/224; 709/227; 709/229; 705/1; 705/22

(58) Field of Classification Search ................. 709/225, 709/203, 206, 207, 224, 227, 229; 705/1, 705/22, 28, 8, 29, 44
See application file for complete search history.

(56) References Cited

U.S. PATENT DOCUMENTS 4,928,274 A 5/1990 Gilhousen et al.
4,979,170 A 12/1990 Gilhousen et al.
5,017,926 A 5/1991 Ames et al.
6,124,810 A 9/2000 Segal et al.
6,519,568 B1 * 2/2003 Harvey et al. .................. 705/1
6,643,717 B1 * 11/2003 Rustad et al. ................. 710/32
6,829,234 B1 * 12/2004 Kaplan et al. ............... 370/352

(Continued)

FOREIGN PATENT DOCUMENTS

WO 0062227 10/2000

(Continued)

OTHER PUBLICATIONS

International Preliminary Examination Report—PCT/US02/036640, IPEA/US—Feb. 20, 2004.

*Primary Examiner*—Ario Etienne
*Assistant Examiner*—Barbara N Burgess
(74) *Attorney, Agent, or Firm*—Ashish L. Patel

(57) ABSTRACT

A system for providing online service reports to user subscribers. The service reports contain service information about services rendered by one or more service providers operating at the direction of a service administrator. The system includes a service hub coupled between the service administrator and the one or more service providers. The service hub receives an access message that defines access rights for the user subscribers. A decoder decodes the service information from one or more operational messages exchanged between the service administrator and the one or more service providers. A network server is coupled between the service hub and the user subscribers via a communication network. The network server receives a request from a selected user subscriber, and in response, provides at least a portion of the selected service information to the selected user subscriber based on the access rights.

27 Claims, 8 Drawing Sheets

U.S. PATENT DOCUMENTS

| | | | | |
|---|---|---|---|---|
| 7,191,233 | B2 * | 3/2007 | Miller | 709/227 |
| 7,353,267 | B1 * | 4/2008 | Cunningham et al. | 709/224 |
| 2001/0031656 | A1 * | 10/2001 | Marshall et al. | 463/6 |
| 2002/0032612 | A1 * | 3/2002 | Williams et al. | 705/26 |
| 2002/0046214 | A1 * | 4/2002 | Sandifer | 707/104.1 |
| 2002/0101826 | A1 * | 8/2002 | Giacopelli et al. | 370/252 |
| 2002/0111845 | A1 * | 8/2002 | Chong | 705/8 |
| 2002/0116508 | A1 * | 8/2002 | Khan et al. | 709/229 |
| 2002/0166063 | A1 * | 11/2002 | Lachman et al. | 713/200 |
| 2003/0069922 | A1 * | 4/2003 | Arunachalam | 709/203 |
| 2003/0078785 | A1 * | 4/2003 | Antonello et al. | 705/1 |
| 2004/0015366 | A1 * | 1/2004 | Wiseman et al. | 705/1 |
| 2006/0020366 | A1 * | 1/2006 | Bloom | 700/226 |

FOREIGN PATENT DOCUMENTS

| | | |
|---|---|---|
| WO | 0118682 | 3/2001 |

* cited by examiner

| PARAMETER | CONTROL MESSAGE CONTENT |
|---|---|
| 0 | START OF CONTROL MESSAGE |
| 1 | ADMINISTRATOR IDENTIFIER |
| 2 | SERVICE TYPE IDENTIFIER |
| 3 | SERVICE PROVIDER IDENTIFIER |
| 4 | MACRO CODE (001) |
| 5 | MACRO CODE (003) |
| 6 | MACRO CODE (004) |
| 7 | N/A |
| 8 | MACRO CODE (002) |
| 9 | MACRO CODE (005) |
| ⋮ | ⋮ |
| X | END OF CONTROL MESSAGE |

| PARAMETER | ACCESS MESSAGE CONTENT | |
|---|---|---|
| 0 | START OF ACCESS MESSAGE | 602 |
| 1 | ADMINISTRATOR IDENTIFIER | 604 |
| 2 | SERVICE TYPE IDENTIFIER | 606 |
| 3 | USER SUBSCRIBER IDENTIFIER | 608 |
| 4 | MACRO CODE | 610 |
| 5 | MACRO CODE | 610 |
| 6 | MACRO CODE | 610 |
| 7 | USER SUBSCRIBER IDENTIFIER | 612 |
| 8 | MACRO CODE | 614 |
| 9 | MACRO CODE | 614 |
| ⋮ | ⋮ | |
| X | END OF ACCESS MESSAGE | 616 |

FIG. 6

| PARAMETER | OPERATIONAL MESSAGE CONTENT |
|---|---|
| 0 | START OF OPERATIONAL MESSAGE |
| 1 | ADMINISTRATOR IDENTIFIER ~702 |
| 2 | SERVICE TYPE IDENTIFIER ~704 |
| 3 | SERVICE PROVIDER IDENTIFIER ~706 |
| 4 | ⎰ MACRO CODE ~708 |
| 5 | 710 ⎱ MACRO CODE |
| 6 | ⎰ SUBSCRIBER IDENTIFIER |
| 7 | 712 ⎱ SUBSCRIBER IDENTIFIER |
| ⋮ | ⋮ |
| X | END OF OPERATIONAL MESSAGE ~714 |

700

SYSTEM FOR PROVIDING ONLINE SERVICE REPORTS

BACKGROUND OF THE INVENTION

I. Field of the Invention

The present invention relates generally to online reporting systems, and more particularly, to a system for providing online service reports to user subscribers.

II. Related Art

The use of wireless communication systems is well known for transmitting information between fixed stations and one or more geographically dispersed mobile receivers. For example, satellite communication systems have been used in the trucking industry for many years to provide messaging and location information between fleet-owned dispatch centers and their respective tractor-trailer vehicles. Such systems offer significant benefits to fleet owners because they allow almost instantaneous communications and real-time position information. An example of such a satellite communication system is disclosed in U.S. Pat. No. 4,979,170 entitled "Alternating Sequential Half Duplex Communication System and Method"; U.S. Pat. No. 4,928,274 entitled "Multiplexed Address Control in a TDM Communication System"; and U.S. Pat. No. 5,017,926 entitled "Dual Satellite Navigation System"; U.S. Pat. No. 6,124,810 entitled "Method and Apparatus for Automatic Event Detection in a Wireless Communication System," all assigned to the assignee of the present invention and all incorporated herein by reference thereto as if repeated verbatim immediately hereinafter.

In the satellite communication system described by the above-mentioned patents, fleet-owned dispatch centers communicate with their respective vehicles using land-based systems such as telephone or fiber-optic networks to a hub, otherwise known as a network management facility (NMF). The NMF acts as a central communication station through which all communications between vehicles and dispatch centers pass. The NMF comprises a number of network management computers (NMCs), each NMC responsible for providing a communication path from the NMF to geographically dispersed vehicles in the communication system using a geosynchronous satellite. The geosynchronous satellite comprises one or more transponders, which are electronic circuits well known in the art for relaying high frequency satellite communication signals between remote locations. Each NMC is assigned an individual transponder, with each transponder operating at a unique frequency in order to avoid interference with communication signals on other transponders. In the satellite communication system of the above-referenced patents, each transponder is capable of handling the communications needs of approximately 30,000 vehicles. Each vehicle in the communication system is equipped with a transceiver, otherwise known as a mobile communication terminal (MCT), for communicating message and location information to a pre-designated NMC via the geosynchronous satellite.

In a typical transaction where trucking companies, or carriers as they are known, with the capability and flexibility to transport large amounts of goods to multiple destinations efficiently, a carrier is called upon to transport goods from one location to another by a customer, otherwise known as a shipper. Examples of shippers might include almost any manufacturer of goods. Sometimes a carrier will have a standing contract with a shipper to transport goods that the shipper desires to be transported. The shipper provides delivery instructions to the carrier comprising details of the shipment, including, for example, when and where to pick up the goods and where to ship them. Generally, these instructions pertaining to a shipment are provided to the carrier or its representative (e.g., a vehicle operator of carrier) in the form of a document commonly referred to as a "bill of lading." The bill of lading may also provide other pertinent information concerning the shipment, such as a description and quantity of the goods being shipped.

However, once the shipping services begin, it may be difficult for the customer, or other interested parties to obtain status information about the shipment. For example, for goods being shipped a great distance, i.e., cross-country, it may be difficult for the customer to determine exactly where the goods are at any given time. Although it may be possible to contact the carrier directly to obtain a status report, this process is time consuming and inefficient, since the carrier must first obtain the information to pass along to the interested party. Furthermore, the information may not be up to date, or may not be complete enough to satisfy the customer's concerns.

In addition, there are security issues to address. For example, many parties may be interested in the status of a shipment, and so it is important that the information be held confidential and not be provided to the wrong parties.

Therefore, what is needed and what has been invented is a system and method that overcomes the deficiencies of conventional ways to report the status of services provided by a business, such as a carrier in a freight shipping business. What is more specifically needed and what has been invented is a system and method for providing online service reports to user subscribers, where the reports contain information customized for each individual user subscriber and that are protected from unauthorized access.

SUMMARY OF THE INVENTION

The present invention includes a system for providing online service reports to user subscribers. The service reports contain information about services rendered by service providers that are coordinated by a service administrator.

The system overcomes the problems associated with conventional systems by providing a way for individualized service reports containing selected service information to be delivered to specific online user subscribers. Thus, for a given rendered service, it is possible to provide different service information to different user subscribers and thereby target selected service information for delivery. For example, in a system where freight shipping services are provided by trucks coordinated by a truck dispatcher, it is possible to target truck arrival information to a customer, truck operational information, such as speed and fuel consumption, to the truck dispatcher, and truck maintenance information, such as truck mileage, to a truck maintenance department. In this example, the customer, truck dispatcher and the truck maintenance department all represent user subscribers that may receive online service reports. As a result, any pre-selected and authenticated user subscriber can login to the system to receive an online service report customized for their specific use.

In one embodiment of the present invention, a system for providing online service reports to user subscribers is provided. The service reports contain service information about services rendered by one or more service providers operating at the direction of a service administrator. The system includes a service hub coupled between the service administrator and the one or more service providers. The service hub includes a receiver that receives an access message that defines access rights for the user subscribers, and a decoder that decodes the service information from one or more operational messages exchanged between the service administrator and the one or more service providers. The system also includes a network server coupled between the service hub and the user subscribers via a communication network. The network server includes logic to receive a request from a selected user subscriber, and in response, provide at least a portion of the selected service information to the selected user subscriber based on the access rights defined in the access message.

In another embodiment of the present invention, a service hub operable to provide online service reports to user subscribers is provided. The service reports contain service information about services rendered by a service provider operating at the direction of a service administrator. The service hub includes a processor operable to receive an access message that associates the service information with the user subscribers. The processor also includes logic to exchange operational messages between the service provider and the service administrator. A decoder is provided that is coupled to the processor and is operable to decode the operational messages to extract the service information. The service hub also includes a server interface operable to receive a request for service information from the user subscriber and provide selected service information to the user subscriber based on the access message.

In still another embodiment of the present invention, a method for operating a service hub for providing online service reports to user subscribers is provided. The service reports contain service information about services rendered by a service provider and coordinated by a service administrator. The method includes steps of determining access rights that associate the service information with the user subscribers, exchanging at least one operational message between the service provider and the service administrator, decoding the operational message to extract the service information, receiving a request from a selected user subscriber, and providing selected service information to the selected user subscriber, wherein the selected service information is derived from the service information based on the access rights.

BRIEF DESCRIPTION OF THE DRAWINGS

The foregoing aspects and the attendant advantages of this invention will become more readily apparent by reference to the following detailed description when taken in conjunction with the accompanying drawings wherein:

FIG. 5 shows one embodiment of a control message for use in the system of FIG. 1;

FIG. 6 shows one embodiment of an access message for use in the system of FIG. 1;

DETAILED DESCRIPTION OF THE INVENTION

The present invention includes a system for providing online service reports to user subscribers. The service reports contain information about services rendered by service providers and coordinated by a service administrator. For example, the system is suitable for use to provide online service reports in a shipping business where trucks operate as service providers and a truck dispatcher operates as an administrator. For example, the truck dispatcher (administrator) coordinates the trucks (service providers) to ship goods from merchants to consumers, where the merchants and consumers represent user subscribers who are given access rights to receive customized online service reports pertaining to the shipment of the goods.

However, the system included in the present invention is suitable for use with virtually any type of service system. For example, in a repair service businesses, such as a computer systems repair, or electrical and plumbing repair businesses, the system is suitable to provide online service reports to interested parties to provide information about the dispatch, status and completion of the service.

Therefore, although one or more embodiments of the present invention are described herein with reference to providing online reports with regards to shipping services, the embodiments are not limited for use with only shipping businesses and may, in fact, be easily adapted for use with virtually any type of system or service where it would be beneficial to provide interested parties with online customizable service reports.

Exemplary Embodiment

Figure 1:
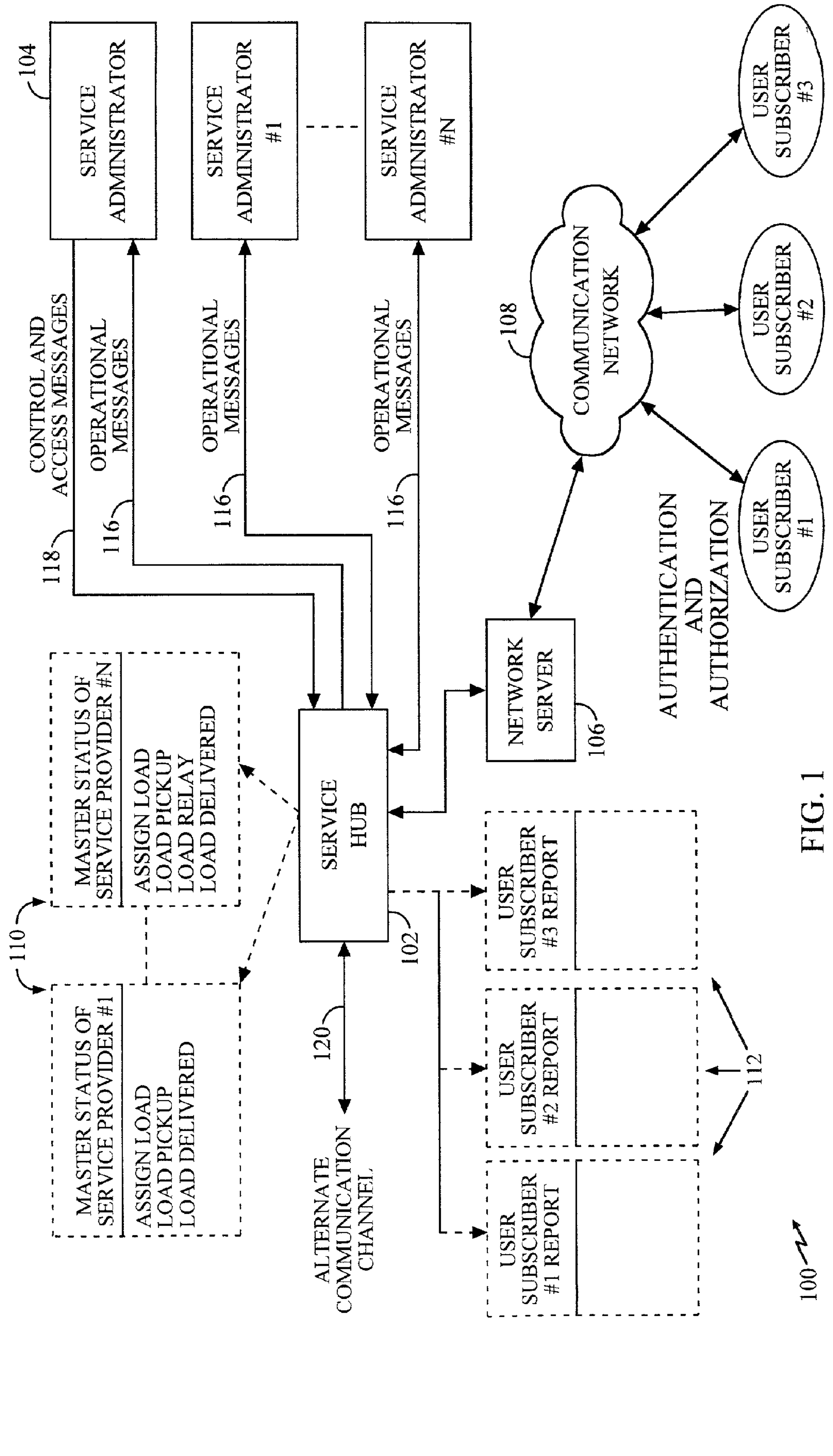
FIG. 1 shows one embodiment of a system for providing online service reports to user subscribers in accordance with the present invention.

FIG. 1 shows one embodiment of a system 100 for providing online service reports to user subscribers in accordance with the present invention. The system 100 includes a service hub 102 that is coupled to a service administrator 104 and service providers 1 through N. The service hub 102 includes logic to allow the service administrator and the service providers to exchange operational messages 116. For example, in a freight shipping system, the operational messages may include parameters to indicate that a shipment is to be picked up, or that a shipment has been delivered. Thus, the operational messages contain various types of information and status about the services being rendered by the service providers and coordinated by the administrator.

To facilitate speed and efficient communication, the operational messages may include macro codes. Macro codes are codes that are predefined to represent specific information. For example, in the freight shipping system, the dispatcher (administrator) may send an operational message that contains a macro code of "001" to a specific truck (service provider) to indicate that the truck is assigned to pickup goods at a particular source location. After arriving at the source location and making the pickup, the truck may send an operational message to the dispatcher that includes the macro code "002" indicating that the pickup has been made. Thus, for any particular service or business, a set of macro codes can be predefined to indicate specific instructions or status information. For example, one shipping business may use messages with one set of macro code definitions, and another shipping business may use messages with another set of definitions for the same macro codes. Thus, the same macro codes may have a different meaning for each respective business. However, the use of the macro codes shortens the operational messages, and thereby reduces the cost of communications between the administrator and the service providers.

Communication between the administrator 104, service hub 102 and the service providers (1-N) may be accomplished using virtually any type of communication system. For example, communication links between the service hub and the service providers may be formed from a wireline connection, such as a telephone line, or may be formed from a wireless connection, such as in a radio, cellular, or satellite communication system. One example of a communication system suitable for use to provide communication links between the administrator, service hub and the service providers can be found in U.S. Pat. No. 4,979,170. In this representative system, the use of satellite communication links is described. Therefore, embodiments included in the present invention are not limited by the type of communication links used, so that virtually any type of communication links between the administrator, service hub and the service providers may be used within the scope of the invention.

The hub 102 is also coupled to a network server 106 that communicates with online user subscribers 1, 2, and 3 via a communication network 108. In one embodiment of the invention, any type of communication network may be used, such as the Internet, and the network server 106 includes logic to interface and communicate via the selected communication network.

Using the communication network 108, the user subscribers may request and receive information about services provided by the service providers (1-N) or the administrator 104. In order to receive the service information, the user subscribers may need to be authorized and authenticated to ensure that the service information is protected from unauthorized access. In one embodiment, the network server includes logic to authenticate user subscribers that request to receive service information.

In one embodiment on the invention, the network server 106 is a stand-alone server coupled directly to the service hub 102 as shown in FIG. 1. In another embodiment, the network server 106 is incorporated into the service hub 102 so that the service hub may couple directly to the communication network 108. In still another embodiment of the invention, the network server 106 is a stand alone server and couples to the service hub via the communication network 108 so that it is possible that the network server can communicate with several service hubs via the communication network.

The hub 102 also includes logic to receive control and access messages 118. In one embodiment of the invention, the hub 102 receives the control and access messages from the administrator 104 as shown in FIG. 1. In another embodiment, the hub receives control and/or access messages from another source, such as a contracting agent that has negotiated an agreement for services to be provided.

The control and access messages 118 are used to provide initialization information to the hub to allow specific services to be provided by the administrator and the service providers. The control and access messages 118 are also used to associate selected service information with specific user subscribers. For example, service information related to services rendered by service provider #1 might be associated with user subscriber #1. The system then operates to provide online access to this service information to user subscriber #1 upon receiving an authenticated request from subscriber #1.

The control and access messages 118 may be received at the hub 102 using virtually any type of communication link. For example, the messages 118 may be transmitted using a wireline connection, such at a telephone line, or a wireless connection, such as in a radio, cellular, or satellite communication system. In one embodiment of the invention, the operational messages 116 are received at the hub via satellite communication links and the control and access messages 118 are received at the hub using standard telephone lines.

During operation of the system 100, the service hub uses the control and access messages 118 and the operational messages 116 to form master status tables 110 indicating status information about services rendered by the administrator and each service provider. The master status tables include information about such things as the initiation of services, status indications that specific services have been provided, or that service has been completed.

In one embodiment of the invention, the hub 102 uses the master status tables 110 and the control and access messages 118 to form specific user subscriber reports 112. The user subscriber reports 112 provide information from the master status tables that is accessible to each user subscriber. The control and access messages are used to determine which information from the master status tables will be incorporated into each user report.

In one embodiment of the invention, the user subscriber reports may be located at the service hub 102. In another embodiment of the invention, the user subscriber reports may be located at the network server 106. In still another embodiment of the invention, individual user subscriber reports are not maintained. Instead, each report is generated upon receiving a request for service information from each user subscriber. Any manner of maintaining a database of service information and associating information items in the database with selected user subscribers may be used within the scope of the present invention. During operation, the system constantly updates its service information, so that every time a user subscriber makes a new request for service information, they receive the most up to date information. However, they will only receive service information for which they have been granted access to.

As a result, it is possible for the user subscribers to request service information from the network server, and in response, receive specific service information as determined from the control and access messages. Thus, in effect, customized reports are generated for each user subscriber and may be accessed when an online request from a use subscriber is received.

In another embodiment of the invention, specific service information is "pushed" to specific user subscribers periodically or based on the occurrence of specific events. In this embodiment, selected service information maintained in the master status tables is sent to user subscribers via the communication network or other communication system. For example, service information may be provided to selected user subscribers via email, facsimile, voice mail or any other communication technique. For example, in a freight shipping business, when the delivery of goods occurs, the service hub 102 intercepts a message from the service provider to the administrator indicating that the goods have been delivered. In one embodiment, the service hub decodes a macro message to determine that the goods have been delivered. The service hub then assembles selected information from the master status tables about the services rendered, and sends an email to a specific user subscriber that contains the selected information. Thus, service information is pushed to the user subscriber without a specific online request from the user subscriber. The information may be pushed to the user subscriber via the communication network 108 or via an alternate communication channel 120 that is coupled to the service hub and provides access to alternate communication systems such as standard telephone systems.

In another embodiment of the invention, the access information that associates service information with user subscribers is included as part of the operational messages 116. Thus, the service providers or service administrators may originate and transmit this access information to the hub 102. Therefore, it is possible for hub to receive access information from a service provider or service administrator and update its status tables accordingly to allow the various user subscriber access to the received selected service information. For example, in a freight shipping business, a service provider (truck) may have mechanical problems, and as a result, sends an operational message indicating this situation to the administrator (dispatcher). The truck may also include access information so that the truck maintenance department will have access to information. In fact, once the service hub decodes the operational message, the service hub may generate an email that "pushes" this information to the maintenance department.

Figure 2:
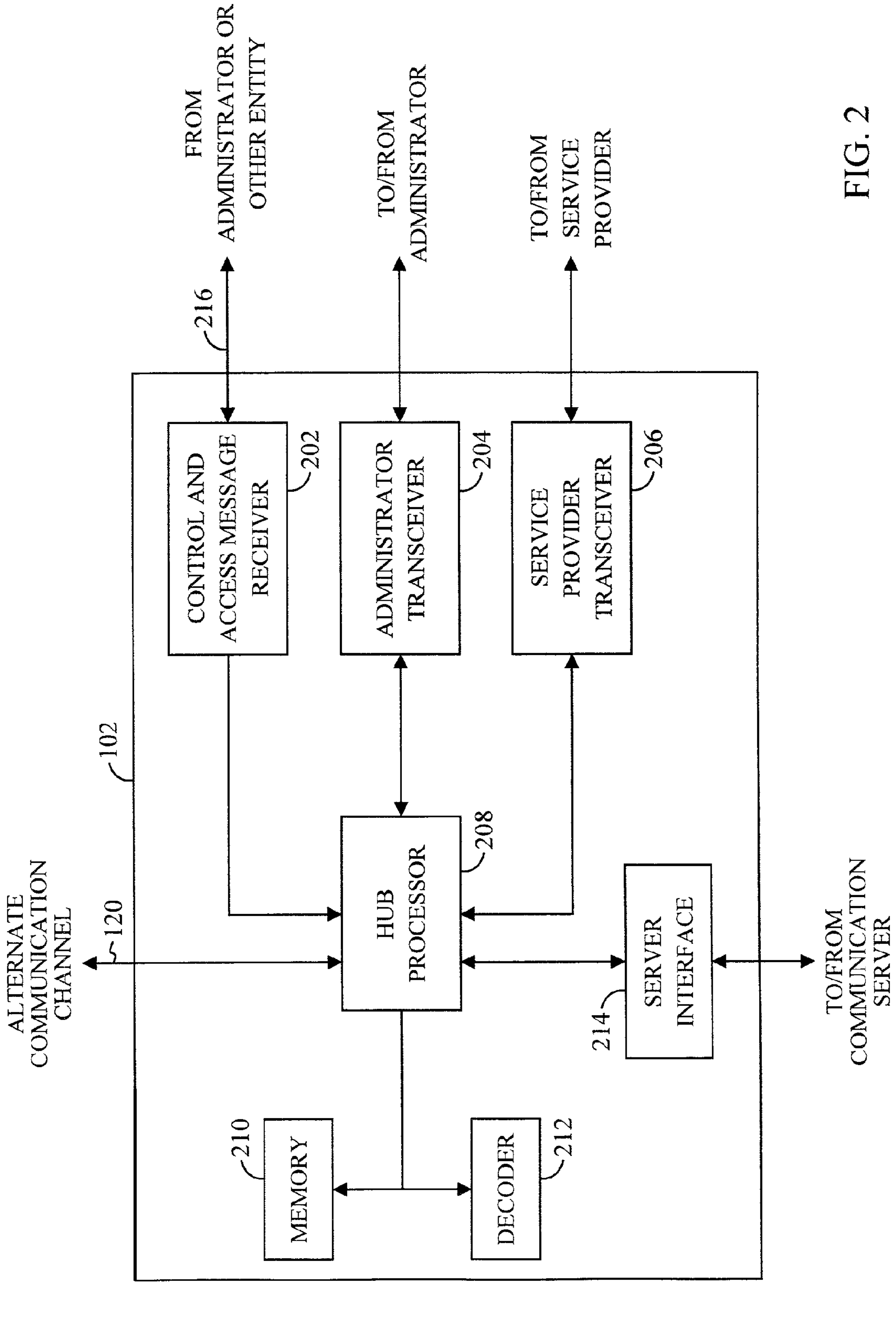
FIG. 2 shows one embodiment of a service hub constructed in accordance with the present invention for use in the system of FIG. 1.

FIG. 2 shows one embodiment of the service hub 102 constructed in accordance with the present invention. The service hub 102 includes a control and access message receiver 202, an administrator transceiver 204, a service provider transceiver 206, a hub processor 208, a memory 210, a message decoder 212, and a server interface 214. It should be understood that this is only one possible configuration. For example, message receiver 202 could be combined with administrator transceiver 204 in another embodiment.

In one embodiment of the invention, the control and access message receiver 202 operates to receive control and access messages from the administrator 104, at input 216, and provide these messages to the hub processor 208. In another embodiment of the invention, the message receiver 202 receive the control and/or access message from some other entity, such as a contracting agent or a central control system.

The control messages are used to initiate services. For example, control messages are used to inform the hub processor that a specific service has been contracted for, or that a specific set of macro code definitions will be used in the operational messages. Thus, the control messages provide the hub processor with the macro code definitions for the service to be provided. In another embodiment, macro codes are stored within memory 210 for each administrator.

The access messages associate service information with specific user subscribers. For example, the access messages are used to inform the hub processor what service information is to be made available to selected user subscribers. Thus, one or more initial access codes are provided to the hub processor. However, during operation of the system, the access codes may be changed by the reception of additional access messages, either from an administrator, or from another entity such as a service provider.

The hub processor 208 may be comprised of a CPU, software, hardware, programmable logic, or any other type of processing hardware and/or software. The hub processor 208 is also coupled to the administrator transceiver 204 and the service provider transceiver 206. The administrator transceiver operates to transmit and receive operational messages between the hub 102 and the administrator 104. The service provider transceiver 206 operates to transmit and receive operational messages between the hub and the service providers (1-N). As described above, any type of communication technique can be used to provide these communication links.

Operational messages transmitted from the administrator are received by the administrator transceiver 204 and input to the hub processor 208. The processor may then process these messages and/or forward the received operational messages to one or more service providers via the service provider transceiver 206. The same process may occur in the reverse direction, where one or more service providers transmit operational messages to the hub via the service provider transceiver 206, and the processor 208 operates to process and/or forward these messages to the administrator 104 using the administrator transceiver 204. Thus, the hub processor has access to operation messages exchanged between the administrator and the service providers, and as a result, the hub processor 208 may monitor various service information and status contained in the operational messages.

As described above, any type of communication technology may be used to provide transmission of the control and access messages, and the operational messages. Thus, the access message receiver, the administrator transceiver and the service provider transceiver include hardware, software and any logic necessary to facilitate communication using the selected communication technology.

In one embodiment, the message decoder 212 is coupled to the hub processor and operates to decode operational messages exchanged between the administrator and the service providers to determine the status of services being provided. For example, the operational messages might comprise predefined macro messages that are used to convey specific information. By using macro messages, the operational messages can be shorter resulting in more efficient transmission of information. The hub processor receives instructions on how to decode the various macro messages particular to any administrator. Thereafter, the message decoder uses these instructions to decode operational messages that flow through the service hub.

In one embodiment, the decoder 212 is loaded with the pre-defined macro definitions so that the decoder is able to interpret any messages monitored by the processor 208. The decoder 212 decodes the macro messages to determine the information being transmitted. Thus, by using the decoder, the processor 208 is able to determine the service information and status contained in the operational messages.

In another embodiment, decoder 212 is not used. In this case, macro messages are simply forwarded to their respective service administrators where they are decoded locally. Information used to construct online service reports must be sent by administrator 104 after the macro message has been decoded.

The memory 210 is coupled to the processor and is used to store status information related to services being rendered. For example, as operational messages are exchanged between a service provider and the administrator, the processor 208 might direct the decoder to decode the messages and thereafter store the decoded service information and status in the memory as master status tables. As a result, it is possible to form the master status table in the memory, wherein the master status table details various information and status of services rendered by any of the service providers.

The server interface 214 is coupled to the processor 208 and operates to transmit information between the service hub and a communication network server. For example, the network server 106 that is shown in FIG. 1. The server interface allows a request for service information, transmitted from the network server, to be received by the processor 208 and a response to the request may be transmitted from the processor 208 back to the network server. Furthermore, user subscriber tables 112 as shown in FIG. 1 may be created by the processor 208 and transmitted to the network server via the server interface 214, thereby allowing the network server to provide information directly to the user subscribers upon receiving an authenticated request.

Figure 3:
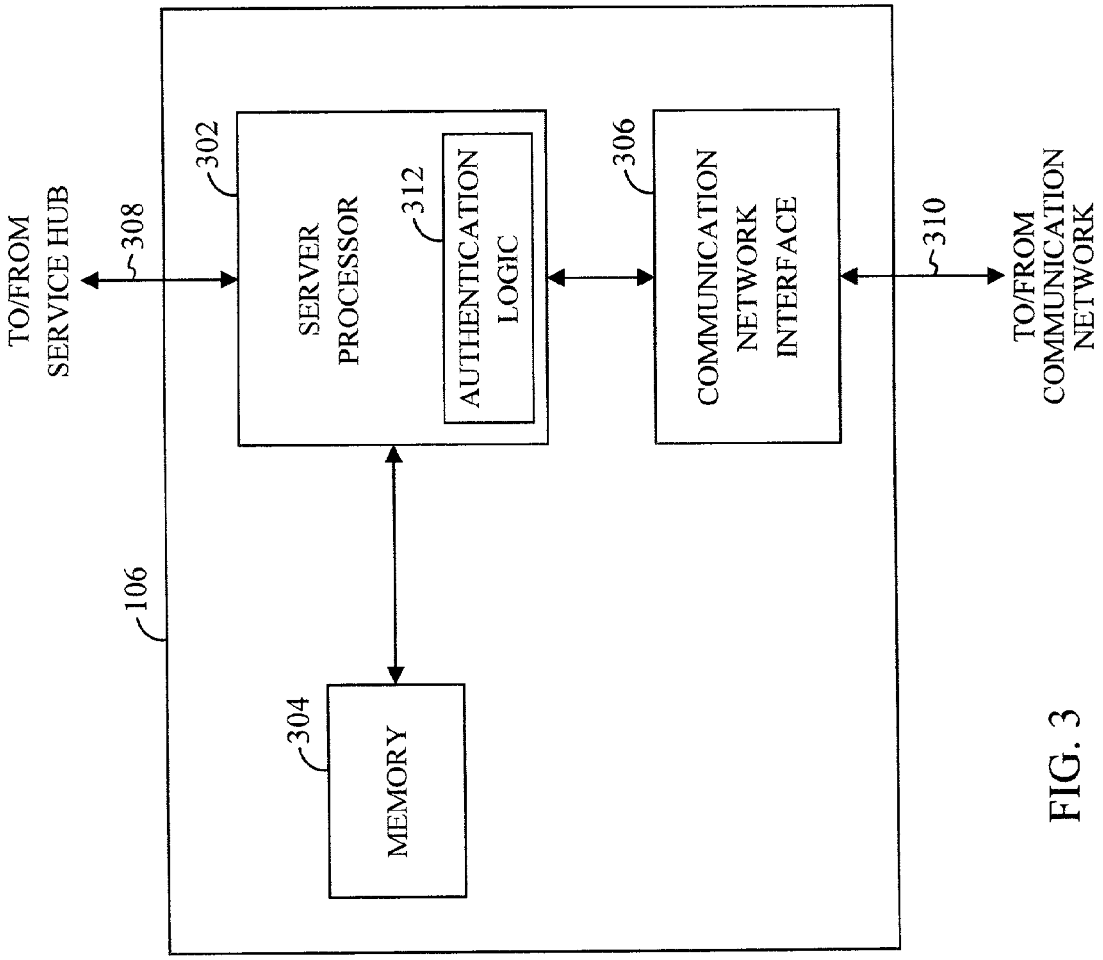
FIG. 3 shows one embodiment of a network server constructed in accordance with the present invention for use in the system of FIG. 1.

FIG. 3 shows one embodiment of a network server 106 constructed in accordance with the present invention. In one embodiment of the invention, the network server 106 is a stand-alone server, however, in another embodiment, the network server 106 is incorporated into the service hub 102, so that the service hub may connect and interact directly with the communication network 108.

The network server includes a server processor 302, a memory 304, and a network interface 306. The server processor 302 may be comprised of a CPU, software, hardware, programmable logic, or any other type of processing hardware and/or software. The server processor 302 includes a communication channel 308 to exchange information with the service hub 102. The server processor also couples to the memory 304 to allow the server processor to store information, such as service information that may be accessible by user subscribers.

The network interface 306 is coupled to the server processor 302 and includes logic and a communication channel 310 to allow the server processor to communicate with user subscribers via the communications network 108. For example, the communications network might be the Internet and the network interface includes logic to allow Internet communications. Thus, it is possible for the network server to communicate with user subscribers via a communication network by using the network interface 306.

The server processor 302 also includes authentication logic 312 to perform authentication of user subscribers. For example, a user subscriber accesses a communication network to request information from the network server. In one embodiment, users enter a predefined username and password. The information requested might be status information related to services provided by a selected service provider. The server processor 302 responds by using its authentication logic to authenticate the user subscriber before providing any of the requested information. Thus, the server processor uses its authentication logic to protect unauthorized access of the service information.

Figure 4:
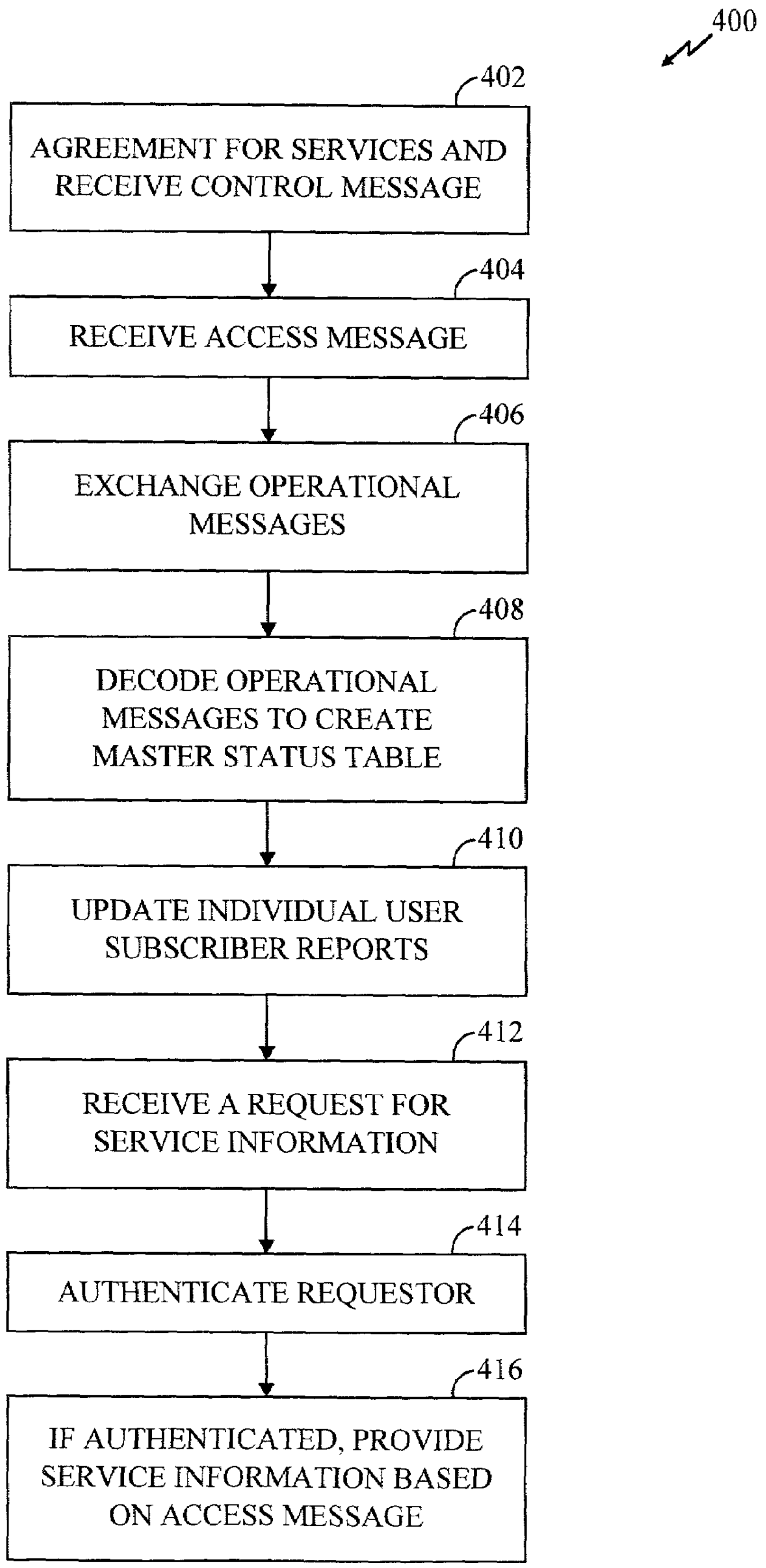
FIG. 4 shows a flow diagram for providing online service reports in accordance with the present invention.

FIG. 4 shows a flow diagram 400 illustrating one method for providing online service reports to user subscribers in accordance with the present invention.

At block 402, an initial agreement for service is made. The agreement includes the type of service and identifies who or what entities will have access to online information as user subscribers. The type of service may be linked to a consumer code, client code, service provider code or any other identifier that can be used to distinguish this service from other provided services. For example, in a shipping system, the type of service may be associated with a shipment or load identifier.

At block 404, one or more access messages are transmitted by an entity, typically administrator 104, to the service hub. The access message(s) associates specific service information with selected user subscribers. For example, the access messages can be transmitted to the hub from the administrator via the access message transceiver. However, the access messages may be sent to the hub from another source. Thus, the service hub uses the access messages to determine what service information will be accessible to selected user subscribers.

At block 406, the administrator and one or more service providers exchange operational messages to provide the contracted services. For example, the administrator sends a message to a service provider to initiate the start of services, after which, the service provider sends messages to the administrator describing the status of services being performed. For example, the administrator might send a message to the service provider that instructs the service provider to pick up a load for shipment at a specific source address. Some time later, the service provider picks up the load and sends a message to the administrator that the load was picked up and is being taken to its final destination.

At block 408, the service hub decodes the operational messages exchanged between the administrator and the service providers to create master status tables that describe the status of services for each service provider. For example, the hub processor and message decoder are used to decode the operational messages exchanged between the administrator and service providers. The decoded messages provide status information that is stored in the memory as part of the master status tables.

At block 410, the service hub updates user subscriber reports from the master status tables. The received access message is used to determine what information from the master status table will be available to each user subscriber. For example, the service hub processor extracts information from the master status tables to create individual user subscriber reports based on the access message. For example, user subscriber #1 may be given access to information about the progress of a specific delivery that is has been picked up, and is in route to its final destination. However, user subscriber #2 may get access to additional information, such at the exact position of the delivery truck.

In addition, the operational messages may contain additional access information, and the service hub uses this access information to update its service reports. For example, if an operational message from a service provider contains access information indicating that information in the message is to be accessible by a selected user subscriber, then the service hub makes the information available to that user subscriber by updating its subscriber reports.

At block 412, a request for service information is received from one or more user subscribers. For example, the request is received via the communication network by the network server. In another embodiment, service reports are "pushed" to user subscribers.

At block 414, the requester of the information is authenticated to verify that the user subscriber is authorized to receive the service information. For example, the authentication logic 312 may be used to authenticate the requester.

At block 416, if the user subscriber is authenticated, the information associated with the requesting user subscriber is provided via the communication network. For example, only the service information that the requesting user subscriber is given access to will be provided in the information sent in response to the request.

Therefore, the reporting system included in the present invention operates to track the status of rendered services by decoding operational messages between service providers and an administrator. The system receives access messages that associate service information with specific user subscribers. When a user subscriber requests service information via a network server, the user subscriber is authenticated and provided only that service information that is authorized by the access messages. Thus, it is possible that different user subscribers with different access rights receive different service information pertaining to the same service agreement.

The above flow graph represents just one embodiment for providing online service reports to user subscribers in accordance with the present invention. A wide range of variation, rearrangement, additions or deletions to the above steps is within the scope of the invention. For example, it may not be necessary to authenticate a requesting user subscriber as shown at block 414, so that this step may be eliminated.

Furthermore, it is also possible that a specific event causes the service hub to push service information to a selected user subscriber. In this case, the service hub decodes the operational messages to determine the status of services being rendered. When a specific event occurs, for example, the reception of a control and/or access message, the service hub operates to send service information directly to a user subscriber via email, facsimile or other transmission method. Thus, the user subscriber automatically receives the service information it has access to when the specific triggering event occurs. The same process can occur at periodic intervals, so that the triggering event is the expiration of a preset time period. For example, service information may be sent to specific user subscribers on a daily basis.

FIG. 5 shows one embodiment of a control message for use in accordance with the present invention. The control message 500 includes a number of parameters that are used to define and initiate service that is to be handled by the service hub.

A start of control message indicator 502 is provided at parameter 0 to indicate the start of the control message. An administrator identifier 504 is used to identify the administrator that is coordinating the service being provided. A service identifier 506 identifies the type of service. For example, the type of service might be an identifier associated with a particular client or shipment. A service provider identifier 508 indicates the service provider that will be used to provide the agreed on services. Although only one service provider identifier is shown in FIG. 5, it is possible that additional service provider identifiers be included in the control message.

Also included in the control message 500 are macro code definitions 510. The macro code definitions define what macro codes will be used to indicated selected service information. For example, parameter 4 has a code of "001" that may be associated with an instruction to "pick up a shipment" that is sent to the service provider from the administrator. Thus, the parameters may be associated with different messages and the macro codes are then associated with those messages. Notice that the message associated with parameter 7 is not used, so that the macro code shows a not available "N/A" at that location.

Thus, associating the macro codes with parameters allows different codes to be used by different businesses to be associated with the same type of information. For example, an instruction to pickup a load may be macro code "001" for one shipping business and "005" for another shipping business. However, the service hub 102 is provided enough information to map these codes to determine the same meaning. The last entry in the control message is an end of control message 512 that identifies the end of the control message.

FIG. 6 shows one embodiment of an access message 600 for use in accordance with the present invention. The access message 600 includes a number of parameters that are used to associate service information with selected user subscribers.

A start of access message indicator 602 is provided at parameter 0 to indicate the start of the access message. An administrator identifier 604 is used to identify the administrator that is coordinating the service being provided. A service identifier 606 identifies the type of service. For example, the type of service might be an identifier associated with a particular client, load, or shipment.

A user subscriber identifier 608 is used to identify the user subscriber for which access rights are being defined. Access rights 610 are defined by the macro codes that define the service information that will be made available to the user subscriber 608. Thus, when any of the listed macro codes are received by the service hub, the information corresponding to the macro codes will be made available to the user subscriber 608 upon request.

Another user subscriber is identified at 612 and macro codes that define the access rights for this user subscriber are shown at 614. It is possible to define the access right for multiple user subscribers by providing the access rights for each user subscriber in a single access message as shown by message 600. Furthermore, in one embodiment of the invention, the user subscriber access rights are defined by only one access message. In another embodiment, multiple access messages may be received that describe access rights for the use subscribers. In the case of multiple access messages for one subscriber, the user subscriber rights defined by the last received access message define the rights for that particular user subscriber.

The last entry in the access message is an end of access message 616 parameter that identifies the end of the access message.

Figure 7:
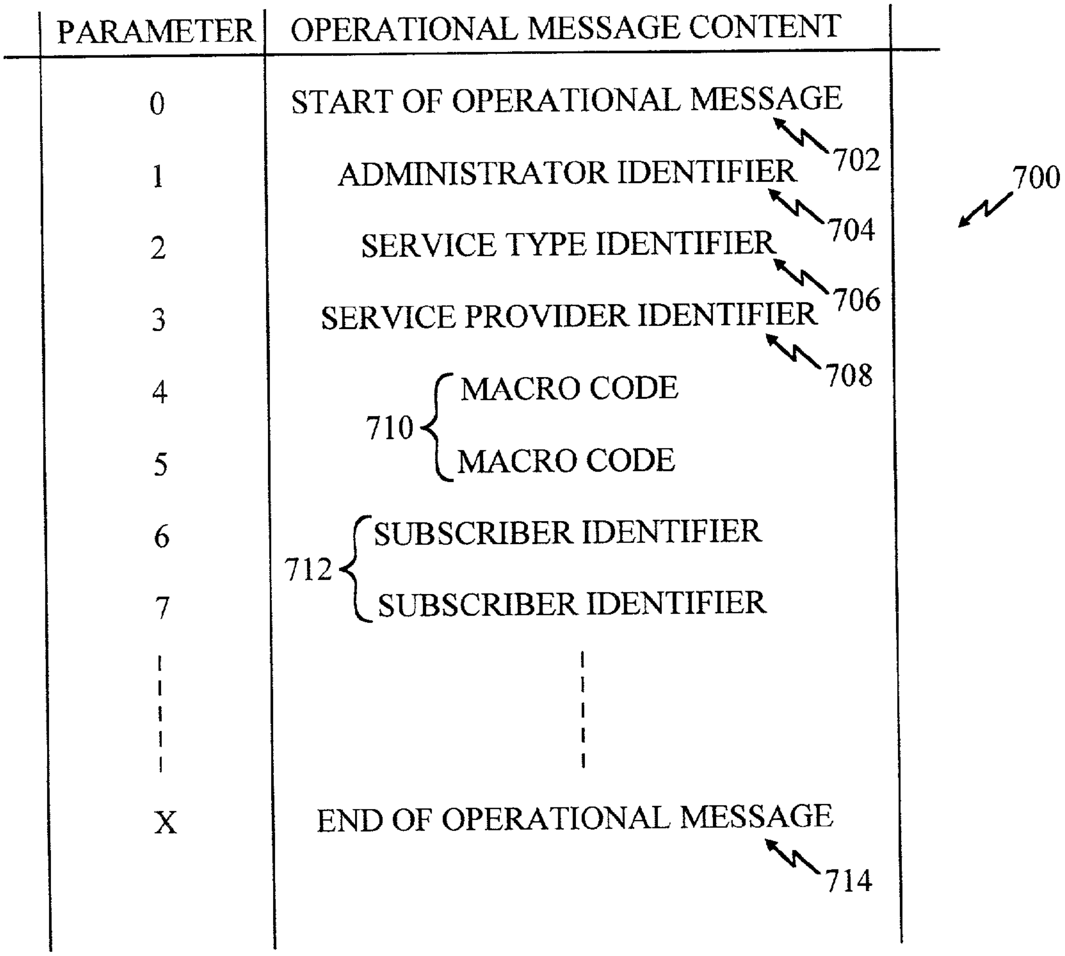
FIG. 7 shows one embodiment of an operational message for use in the system of FIG. 1.

FIG. 7 shows one embodiment of an operational message for use in accordance with the present invention. The operational messages are exchanged between the administrator and service providers to provide instructions, information, and status regarding services being rendered.

The operational message 700 includes a start of operational message identifier 702 to identify the start of the message. Also included are an administrator identifier 704, service type identifier 706 and service provider identifier 708, which are use to identify the sender and receiver of the message and the service type for which information is being provided. Also included are macro codes 710 that identify service activity. For example, a macro code of "001" may indicated that a pickup is required, and a macro code of "002" may indicate that a delivery was made. Thus, the macro codes are used to provide instructions and status information about the service being rendered. Although two macro codes are shown in FIG. 7, it is possible that more or less macro codes appear in the message based on the information to be conveyed.

Additionally, optional access rights 712 are provided in the operational message that will indicate to the service hub that the identified user subscribers are to be allowed access to the information conveyed in the operational message or allowed access to other information. This additional access information does not need to appear in the message since access rights are defined in the access message 600. However, this access information may be transmitted by the service provider or the administrator to modify which user subscribers are given access to the service information contained in the operational message.

Finally, an end of operational message identifier 714 is used to identify the end of the operational message.

Figure 8:
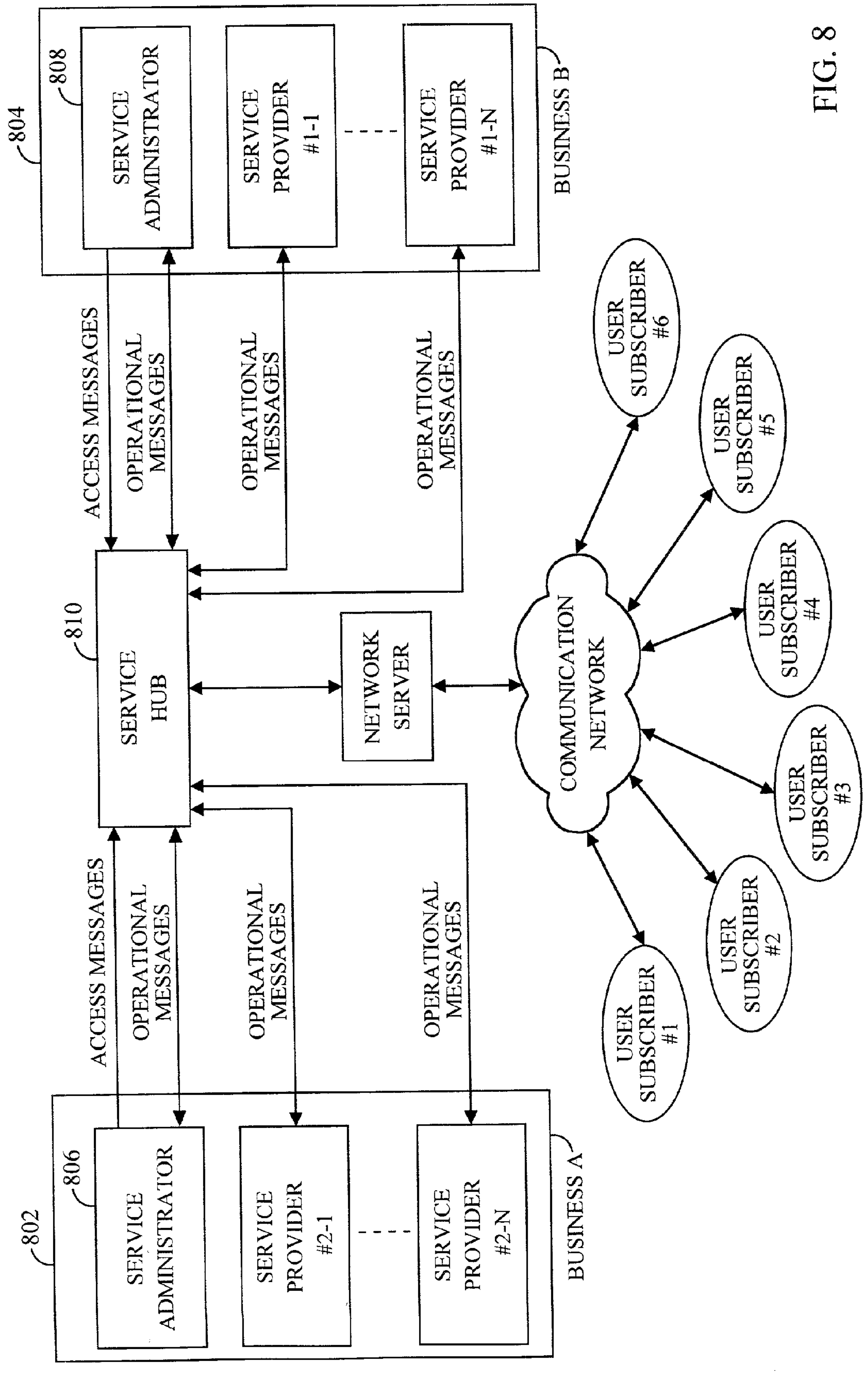
FIG. 8 shows one embodiment for providing online service reports to user subscribers of multiple service systems in accordance with the present invention.

FIG. 8 shows one embodiment for providing online service reports for multiple service-providing businesses in accordance with the present invention. As shown in FIG. 8, two service providing-businesses 802 and 804 include two respective administrators 806 and 808, that communicate with a single service hub 810 to coordinate the delivery of services by different sets of service providers. The service hub 810 maintains master status tables for all the service providers and creates customized service reports for the user subscribers 1-6 based on the access messages received from the multiple administrators.

Although only two service providing businesses are shown in FIG. 8, it is possible that virtually any number of service providing businesses can communicate with the service hub 810. Thus, a wide ranges of services can be offered to the user subscribers with each user subscriber capable of obtaining information rights to receive online service report for any or all of the service providing businesses. Additionally, each service providing business may have different macro definitions for the same service information, however, control messages sent to the service hub by each service-providing business can provide macro definitions service information related to each respective service providing business. Furthermore, it is possible that individual user subscribers receive service information from both businesses. For example, if the two businesses are competing freight shipping businesses, a customer that uses both businesses to provide shipping services may receive online status reports from both businesses.

Exemplary Applications

The following are exemplary applications of a reporting system included in the present invention. For the purposes of clarity, the applications are described in the context of a shipping system and include references to FIG. 1. However, analogous applications are possible in other service systems, and so the description of the applications are not intended to be limited for use solely in shipping systems.

Trigger of Service

A trigger of service is used to determine when services begin and when the status of such services is to be tracked by the service hub. In one embodiment of the invention, service is initialized by control messages that provide the macro codes definitions for the services to be rendered. Thereafter, the operational messages determine when the service hub begins tracking and maintaining master status tables related to the rendered services. For example, in a freight shipping business, the administrator sends an operational message to a service provider (truck) that includes a "load assignment' macro message. The load assignment macro message tells the truck that a load for shipment is assigned to be picked up by the truck. When the service hub decodes this operational message, the service hub begins tracking status information about the truck and the load pickup. However, in other embodiments of the invention, it is possible to use other events to trigger the tracking of services rendered.

Stop-Guess Logic

In one embodiment of the invention, only information contained in the operational messages is included in the master status tables. In another embodiment of the invention, stop-guess logic is used to determine certain status conditions about the services being rendered. The stop-guess logic is additional logic incorporated into the hub processor 208. The stop-guess logic operates to determine conditions for which an operational message has not been received. For example, in a freight shipping business, if a truck (service provider) carrying a load is determined to be within a specific distance (for example, one mile) of its final destination, then the stop-guess logic operates to assume that the truck reached its destination, and updates the status tables to show that the load has been delivered. Thus, it is possible to complete certain status conditions without receiving and decoding a specific operational message. This delivery information is then made available to online user subscribers.

Shipment (Load) Relay

Because the system included in the present invention provides a mechanism to track and maintain status information pertaining to specific services, it is also possible to track individual shipments or loads. For example, the service type identifier in the operational message can be associated with a specific shipment or load. Any services rendered that pertain to the identified load can then be tracked. For example, it is possible to track a load through a load relay event. The load relay event may occur when a load is to be shipped over a border between countries, or when, for some other reason, a load is transferred from one carrier to another. When the load relay occurs, the operational messages that occur may be as follows.

1. Load assignment messages are sent to the truck A and truck B.

2. Truck A obtains the load and sends a pickup message.

3. Truck A drops off the load at the border and sends a drop message.

4. Truck B picks up the load at the border and sends a pickup message.

5. Service Hub now tracks truck B that is carrying the load.

Additional Implementation Information

The following are additional implementation details included in one or more embodiments of a reporting system included in the present invention. For the purposes of clarity, the implementation details are described in the context of a shipping system and include references to FIG. 1. However, analogous applications are possible in other service systems, and so the description of the applications are not intended to be limited for use solely in shipping systems.

Service Requests and Report Types

In one or more embodiments of the present invention, requests for online reports are made by user subscribers. The requests made be of any known type utilizing any message protocol. Therefore, the format and protocol of the requests for service information made by user subscribers is not relevant to the invention and will not be discussed in detail herein.

The reports provided in response to the user subscriber requests may be of any type or protocol. For example, one response is in the form of an HTML document downloaded to the user's computer. Virtually any type of service report can be provided in response to a user subscriber request. The following are examples of some the report types possible.

1. Standard reports that provide basic information about service provided.

2. Shipment status reports that detail where the shipment currently is.

3. Proof of delivery reports that describe when a shipment was delivered.

4. Exception reports that detail any problems that occurred during shipment.

Information Push Function

As described above, one or more embodiments included in the present invention provide an information push function that sends service information to selected user subscribers in response to the occurrence of an event or timing condition. In one embodiment, the service information is pushed through a file transfer protocol (FTP), email, pager, facsimile, telephone, etc. . . . The service information may be in any form or protocol, for example, an ASCII delimited file. In addition, the service information may be provided in various languages and time stamped with a time indicator based on any time zone. Furthermore, the service information may have information based on any type of parameters, i.e., kilometers or miles, kilograms or pounds. Finally, it is also possible to push service information from multiple businesses to one user subscriber. Thus, one user subscriber can receive information about service rendered from competing businesses.

The present invention includes a system for providing online service reports to user subscribers. The embodiments described above are illustrative of the present invention and are not intended to limit the scope of the invention to the particular embodiments described. Accordingly, while one or more embodiments of the invention have been illustrated and described, it will be appreciated that various changes can be made therein without departing from the spirit or essential characteristics thereof. Accordingly, the disclosures and descriptions herein are intended to be illustrative, but not limiting, of the scope of the invention, which is set forth in the following claims.

What is claimed is:

1. System for providing online service reports to user subscribers, wherein the service reports contain service information about services rendered by one or more service providers operating, using wireless communications, at the direction of a service administrator, the system comprising:

a service hub coupled between the service administrator and the one or more service providers, the service hub including a receiver that receives one or more access messages that define access rights for the user subscribers and receives a control message containing definitions for macro messages, the service hub also including a decoder that decodes the service information from one or more operational messages comprising one or more of the macro messages to convey the service information exchanged between the service administrator and the one or more service providers, the macro messages being defined according to the one or more service providers, the same macro message being capable of a different meaning among the one or more service providers, wherein the decoder decodes the macro messages based on the definitions contained in the control message to determine the service information; and a network server coupled between the service hub and the user subscribers via a communication network, the network server including logic to receive a request from a selected user subscriber, and in response, provide at least a portion of the selected service information associated with at least one of the macro messages to the selected user subscriber when a trigger event occurs based on the access rights defined in the one or more access messages as defined by one or more access macro codes comprising the one or more access messages, wherein the access macro codes correspond to the at least one macro message.

2. The system of claim 1, wherein the service hub includes a memory and logic to maintain a master status table that contains the service information describing services rendered by the one or more service providers.

3. The system of claim 1, wherein the network server includes logic to authenticate the selected user subscriber that makes the request.

4. The system of claim 1, wherein the network server is coupled to the service hub via the communication network.

5. The system of claim 1, wherein the service hub is coupled to multiple service administrators associated with multiple service businesses.

6. The system of claim 1, wherein the operational messages include access rights for the user subscribers.

7. A service hub that is operable to provide online service reports to user subscribers, wherein the service reports contain service information about services rendered by a service provider operating, using wireless communications, at the direction of a service administrator, the service hub comprising:

a processor operable to receive at least one access message that defines access rights for the user subscribers and associates the service information with the user subscribers and to receive a control message containing definitions for macro messages, the processor also includes logic to exchange operational messages, comprising one or more of the macro messages to convey the service information, between the service provider and the service administrator, the macro messages being defined according to the one or more service providers, each macro message being capable of different meanings among the one or more service providers;

a decoder coupled to the processor and operable to decode the operational messages and the macro messages based on the definitions contained in the control message to extract the service information; and a server interface operable to receive a request for service information from at least one of the user subscribers and provide selected service information associated with at least one of the macro messages to the at least one user subscriber when a trigger event occurs based on the access rights defined in the at least one access message as defined by one or more access macro codes comprising the at least one access message, wherein the access macro codes correspond to the at least one macro message.

8. The service hub of claim 7, wherein the service hub includes a memory and logic to maintain a master status table that contains the service information describing services rendered by the one or more service providers.

9. The service hub of claim 7, wherein the processor further includes logic to authenticate the at least one user subscriber that makes the request.

10. The service hub of claim 7, wherein the network server is coupled to the service hub via the communication network.

11. The service hub of claim 7, wherein the service hub is coupled to multiple service administrators associated with multiple service businesses.

12. The service hub of claim 7, wherein the operational messages include access rights for the user subscribers.

13. A method for providing online service reports to user subscribers, wherein the service reports contain service information about services rendered by a service provider and coordinated, using wireless communications, by a service administrator, the method comprising steps of:

receiving at least one access message and determining from the at least one access message access rights that associate the service information with the user subscribers;

receiving a control message containing definitions that associate macro messages with the service information;

exchanging at least one operational message between the service provider and the service administrator, the at least one operational message comprising one or more of the macro messages that represent the service information, the macro messages being defined according to the one or more service providers, each macro message being capable of different meanings among the one or more service providers;

decoding the operational message and the macro messages based on the definitions to extract the service information;

receiving a request from a selected user subscriber; and providing, by a server, selected service information associated with at least one of the macro messages to the selected user subscriber when a trigger event occurs, wherein the selected service information is derived from the service information based on the access rights as defined by one or more access macro codes comprising the at least one access message, and the access macro codes correspond to the at least one macro message.

14. The method of claim 13, wherein the step of determining is a step of receiving the at least one access message at a service hub.

15. The method of claim 13, wherein the step of determining is a step of determining the access rights from the at least one operational message.

16. The method of claim 13, wherein the step of receiving a request further includes a step of authenticating the request.

17. The method of claim 13, wherein the step of receiving a request is a step of receiving the request from the selected user subscriber via a communication network.

18. An apparatus for providing online service reports to user subscribers, wherein the service reports contain service information about services rendered by a service provider and coordinated, using wireless communications, by a service administrator, the apparatus comprising:

means for receiving at least one access message and determining from the at least one access message access rights that associate said service information with said user subscribers;

means for receiving a control message containing definitions that associate macro messages with the service information;

means for exchanging at least one operational message between said service provider and said service administrator, said at least one operational message comprising one or more of the macro messages that represent the service information, said macro messages being defined according to said one or more service providers, each said macro message being capable of different meanings among said one or more service providers;

means for decoding said operational message and the macro messages based on the definitions to extract said service information;

means for receiving a request from a selected user subscriber; and means for providing selected service information associated with at least one of the macro messages to said selected user subscriber when a trigger even occurs, wherein said selected service information is derived from said service information based on said access rights as defined by one or more access macro codes comprising the at least one access message, and the access macro codes correspond to the at least one macro message.

19. The apparatus of claim 18, further comprising means for receiving the at least one access message at a service hub.

20. The apparatus of claim 18, further comprising means for determining said access rights from said at least one operational message.

21. The apparatus of claim 18, further comprising means for authenticating said request.

22. The apparatus of claim 18, further comprising means for receiving a request from a selected user subscriber via a communication network.

23. An article comprising a memory having software stored thereon for providing online service reports to user subscribers, wherein the service reports contain service information about services rendered by a service provider and coordinated by a service administrator, which, when executed by a CPU, is adapted to enable said CPU to:

receive at least one access message and determine from the at least one access message access rights that associate said service information with said user subscribers;

receive a control message containing definitions that associate macro messages with the service information;

exchange at least one operational message between the service provider and the service administrator, said at least one operational message comprising one or more of the macro messages that represent the service information, said macro messages being defined according to said one or more service providers, each said macro message being capable of different meanings among said one or more service providers;

decode said operational message and the macro messages based on the definitions to extract the service information;

receive a request from a selected user subscriber; and provide selected service information associated with at least one of the macro messages to the selected user subscriber when a trigger event occurs, wherein the selected service information is derived from the service information based on the access rights as defined by one or more access macro codes comprising the at least one access message, and the access macro codes correspond to the at least one macro message.

24. The article of claim 23, wherein said software, when executed by said CPU, is further adapted to enable said CPU to:

receive the at least one access message at a service hub.

25. The article of claim 23, wherein said software, if executed by said CPU, is further adapted to enable said CPU to:

determine said access rights from said at least one operational message.

26. The article of claim 23, wherein said software, if executed by said CPU, is further adapted to enable said CPU to:

authenticate said request.

27. The article of claim 23, wherein said software, when executed by said CPU, is further adapted to enable said CPU to:

receive the request from the selected user subscriber via a communication network.

* * * * *